(12) United States Patent
Huang

(10) Patent No.: US 7,764,168 B1
(45) Date of Patent: Jul. 27, 2010

(54) TIRE PRESSURE MONITORING SYSTEM WITH A CAPPED TIRE VALVE

(75) Inventor: Shiao-Hwa Huang, Daya Township, Taichung County (TW)

(73) Assignee: Mobiletron Electronics Co., Ltd., Taichung County (TW)

( * ) Notice: Subject to any disclaimer, the term of this patent is extended or adjusted under 35 U.S.C. 154(b) by 268 days.

(21) Appl. No.: 11/744,443

(22) Filed: May 4, 2007

(51) Int. Cl.
*B60C 23/02* (2006.01)

(52) U.S. Cl. ........................ 340/442; 340/445; 73/146.5

(58) Field of Classification Search ................ 340/442, 340/447, 446, 445; 73/146.3, 146.5, 146.8; 137/227

See application file for complete search history.

(56) References Cited

U.S. PATENT DOCUMENTS

| | | | | |
|---|---|---|---|---|
| 5,040,561 A | * | 8/1991 | Achterholt | 137/227 |
| 5,040,562 A | * | 8/1991 | Achterholt | 137/227 |
| 5,581,023 A | * | 12/1996 | Handfield et al. | 73/146.5 |
| 5,754,101 A | * | 5/1998 | Tsunetomi et al. | 340/442 |
| 5,957,567 A | * | 9/1999 | Kish et al. | 362/202 |
| 6,199,575 B1 | * | 3/2001 | Widner | 137/227 |
| 7,068,158 B2 | * | 6/2006 | Komatsu et al. | 340/445 |
| 2003/0001733 A1 | * | 1/2003 | Huang | 340/442 |
| 2004/0112129 A1 | * | 6/2004 | Lundqvist et al. | 73/146 |
| 2004/0164853 A1 | * | 8/2004 | Wang | 340/442 |
| 2005/0007245 A1 | * | 1/2005 | Smith et al. | 340/442 |
| 2007/0044552 A1 | * | 3/2007 | Huang | 73/146.3 |

* cited by examiner

*Primary Examiner*—Davetta W Goins
*Assistant Examiner*—Hoi C Lau
(74) *Attorney, Agent, or Firm*—Apex Juris, pllc; Tracy M Heims

(57) ABSTRACT

The present invention is a tire pressure monitoring system (TPMS) with a capped tire valve. The system includes a baseplate, a signal transmitter, a cap, and an antenna. The antenna is assembled at the bottom of the baseplate, and also positioned outside the connecting end of the baseplate. Thus, the volume of TPMS is considerably reduced, providing resistance to collision and pollution with improved applicability.

5 Claims, 6 Drawing Sheets

TIRE PRESSURE MONITORING SYSTEM WITH A CAPPED TIRE VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a tire pressure monitoring system (TPMS), and more particularly to an innovative system which is sleeved onto the capped tire valve and also provided with an embedded antenna.

2. Description of Related Art Including Information Disclosed Under 37 CFR 1.97 and 37 CFR 1.98

Tires are of utmost importance to vehicles. In the event of insufficient tire pressure, greater frictional force between the tire surface and the ground leads to higher engine load and oil consumption. Tire breakage is even possible due to increased tire temperature and tire deformation. In the event of excessively high tire pressure, the protruding middle section of the tire cannot fully contact the ground, leading to poor water drainage, lower engine load with a tire breakage hazard, or even degraded running stability. Thus, high priority shall be given to regular checking of tire pressure to avoid the adverse influence on vehicles.

For this reason, a typical tire pressure monitoring system (TPMS) is assembled into the tire by a connecting member located at both ends of the tire frame. The tire pressure monitoring system (TPMS) comprises a baseplate, a circuit board, a battery and an antenna, of which the circuit board and battery are assembled over the baseplate. An antenna is assembled over the circuit board. So, the tire pressure information is sent to the vehicle-mounted signal receiver via the antenna, such that the user can know the tire pressure in a timely manner.

However, the conventional tire pressure monitoring system (TPMS) is improved since it is difficult to mount it onto the tire frame or to remove it when replacing the tire frame.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The enhanced efficacy of the present invention is based upon innovative structure. In the present invention, an antenna is embedded into the baseplate. Thus, it is possible to provide stronger resistance to collision and pollution and to reduce the overall volume of the TPMS with improved applicability. Second, the removable cap is screwed over the basement, providing convenient maintenance and replacement of the battery.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
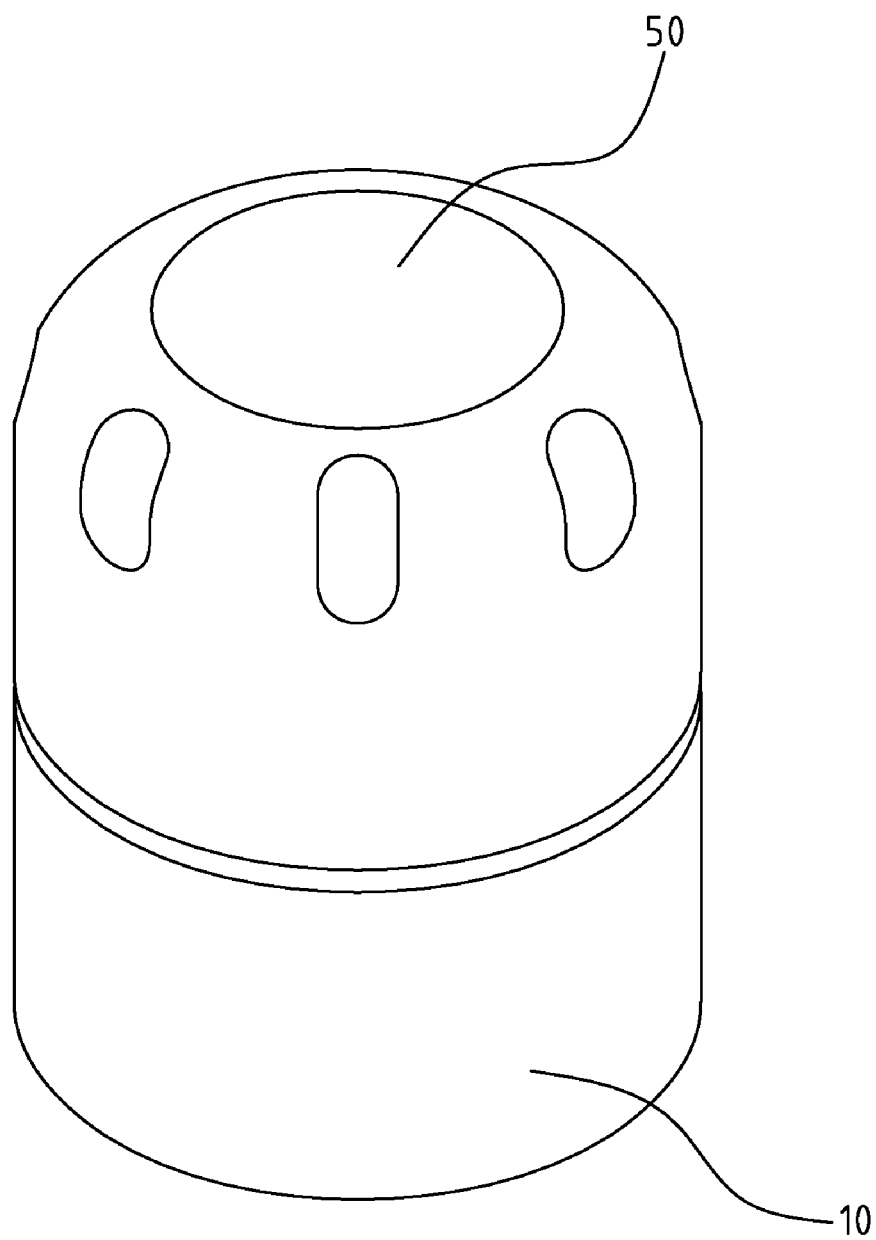
FIG. 1 shows an assembled perspective view of the present invention.
Figure 2:
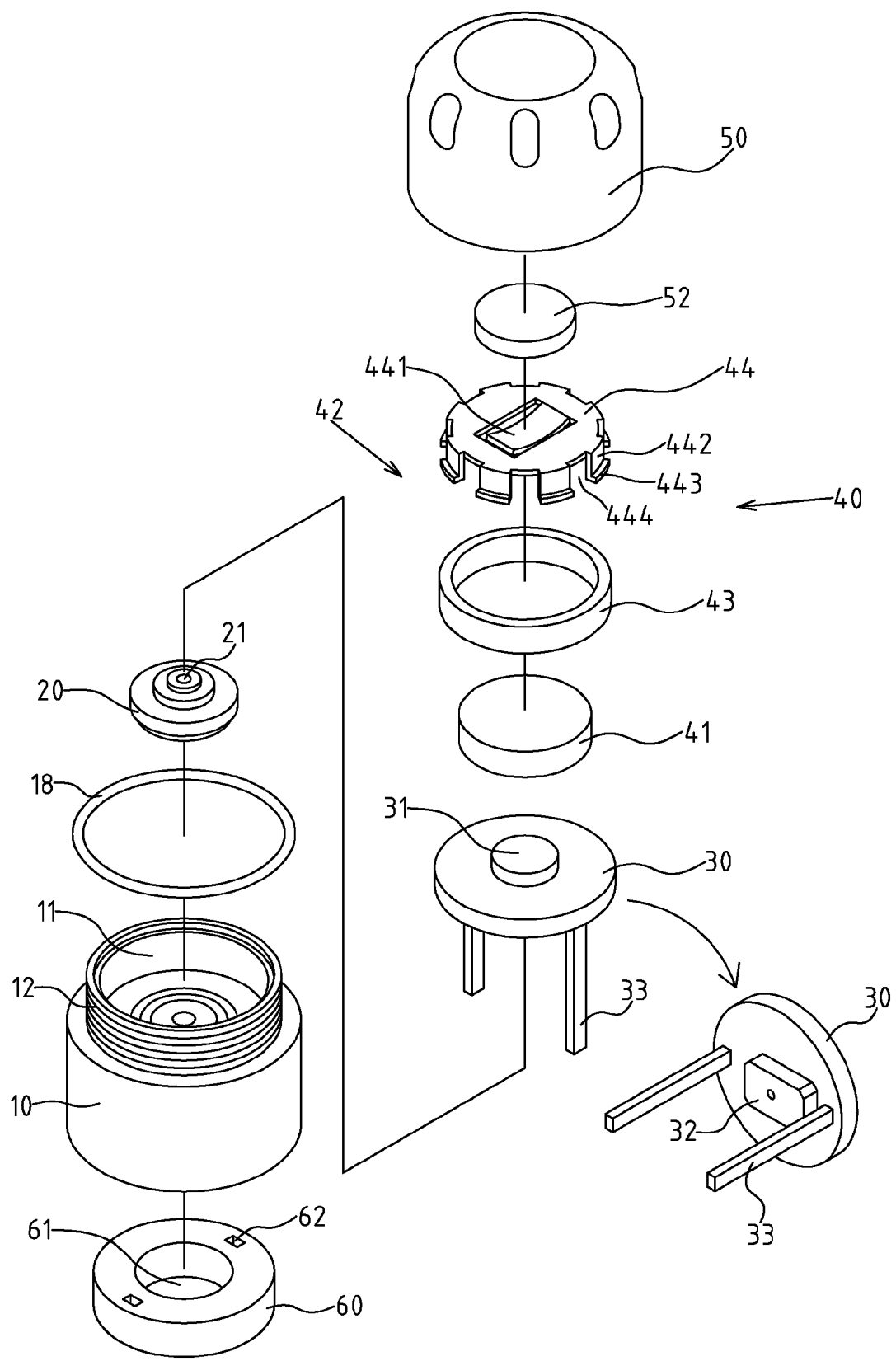
FIG. 2 shows an exploded perspective view of the present invention.
Figure 3:
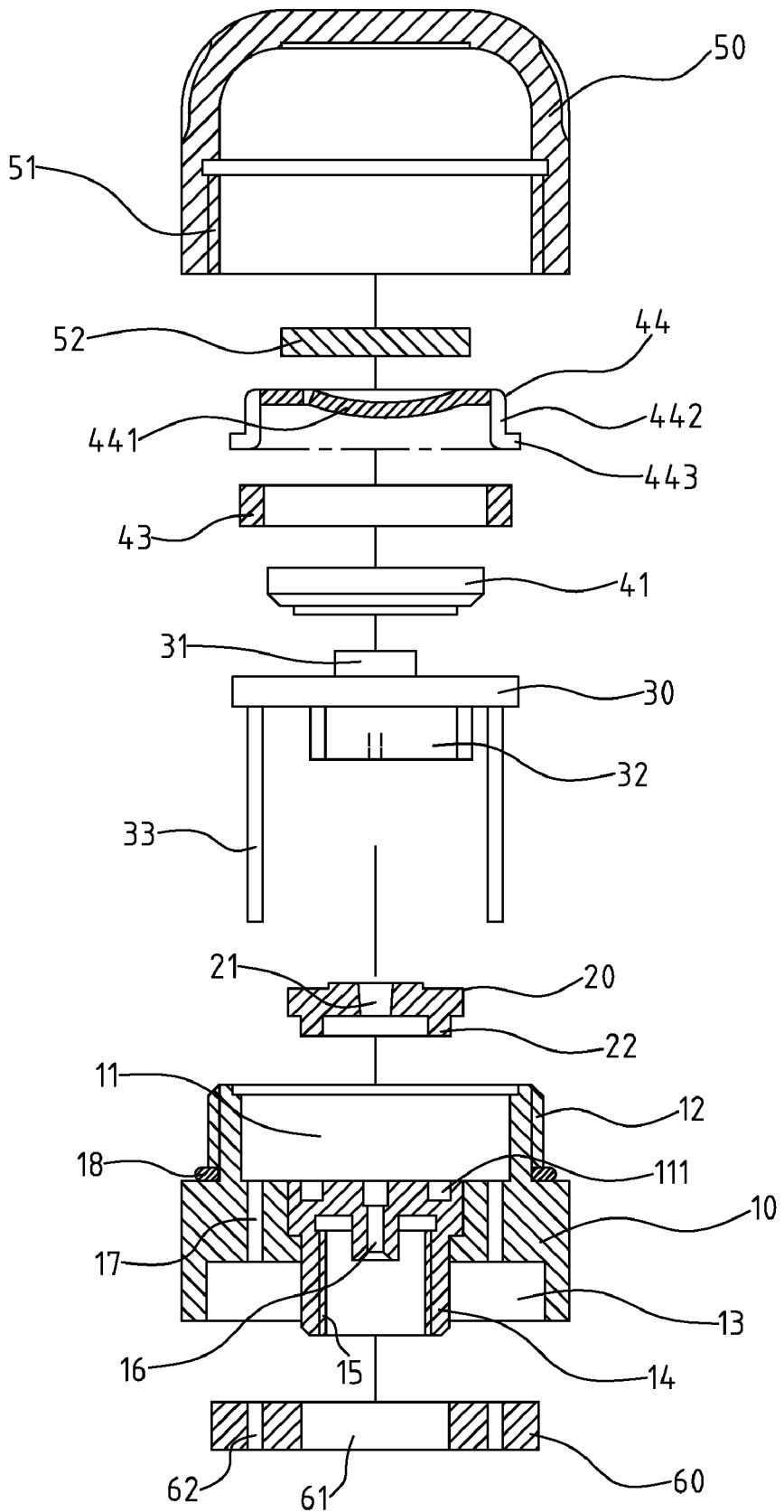
FIG. 3 shows an exploded front view of the present invention.

FIGS. 1, 2 and 3 depict preferred embodiments of improved structure of the tire pressure monitoring system with capped tire valve. The embodiments are provided only for explanatory purpose.

The system of the present invention allows the tire 70 to be connected with the capped tire valve 71, transmitting the tire pressure information via antenna to the receiver.

The tire pressure monitoring system comprises a baseplate 10 with an overhead container 11. A male assembly portion 12 is assembled externally onto the container 11, and a sealing ring 18 is sleeved onto the assembly portion 12. At the center of the baseplate 10, a connecting end 14 with air hole 16 is protruded. The connecting end 14 is provided with a female assembly portion 15, and two bored grooves 17 are placed between the container 11 and antenna container 13. The assembly portion 15 of connecting end 14 under the baseplate 10 is sleeved with the capped tire valve 71, while the air hole 16 is mated with the capped tire valve 71. Moreover, a gasket 20 is embedded into the container 11 over the baseplate 10. At the center of the gasket 20, a through-hole 21 is adapted to connect with the air hole 16 of the baseplate 10. A lug 22 at the bottom can be adapted with a ring groove 111 at the bottom of the container 11.

A signal transmitter comprises a circuit board 30. A conductive portion 31 is placed over the circuit board 30, while an MCU (Micro Controller Unit) 32 and a signal conducting wire 33 are separately assembled under and at both sides of the circuit board 30.

A cap 50 has a separable structure fitted with a female thread 51 to screw the assembly portion 12 over the baseplate 10. The container 11 could be hidden by the cap 50. A lining 52 is assembled between the interior of cap 50 and battery holder 42 to provide buffering.

An antenna 60 is assembled at the bottom of the baseplate 10 and located at the exterior of the connecting end 14. At the bottom of baseplate 10 of the preferred embodiment, a ring antenna container 13 is embedded such that said antenna 60 could be adapted with the antenna container 13. The antenna 60 is positioned outside the screwing hole 15 opposite to the connecting end 14 of the baseplate 10, thus reducing the height of entire TPMS structure. Moreover, a through-hole 61 is placed at the center of the antenna 60. When the antenna 60 is sleeved into the antenna container 13 at bottom of the baseplate 10, the connecting end 14 of the baseplate 10 will protrude from the through-hole 61, while bored grooves 62 are placed at both sides of antenna 60 for connection of the signal conducting wire 33.

A power supply 40 for the transmitter is assembled between the container 11 of the baseplate 10 and the cap 50. The power supply 40 comprises a battery 41 and a battery holder 42, of which the battery holder 42 contains a ring body 43 and a cover body 44. The ring body 43 is mounted over the circuit board 30, where a battery 41 is placed into the ring body 43, and the bottom of battery 41 is linked to the conductive portion 31 on the circuit board 30. A spring 441 folded inwards is placed at the center of the cover body 44, while some ribs 442 are arranged at interval between the groove 444 around the cover body 44. Moreover, a protruding flange 443 at the bottom of rib 442 permits the cover body 44 to be mounted over the battery 41. Also, the cover body 44 could be erected on the ring 43 through the protruding flange 443, so that the cover body's spring 441 is flexibly adapted with the battery 41.

Figure 4:
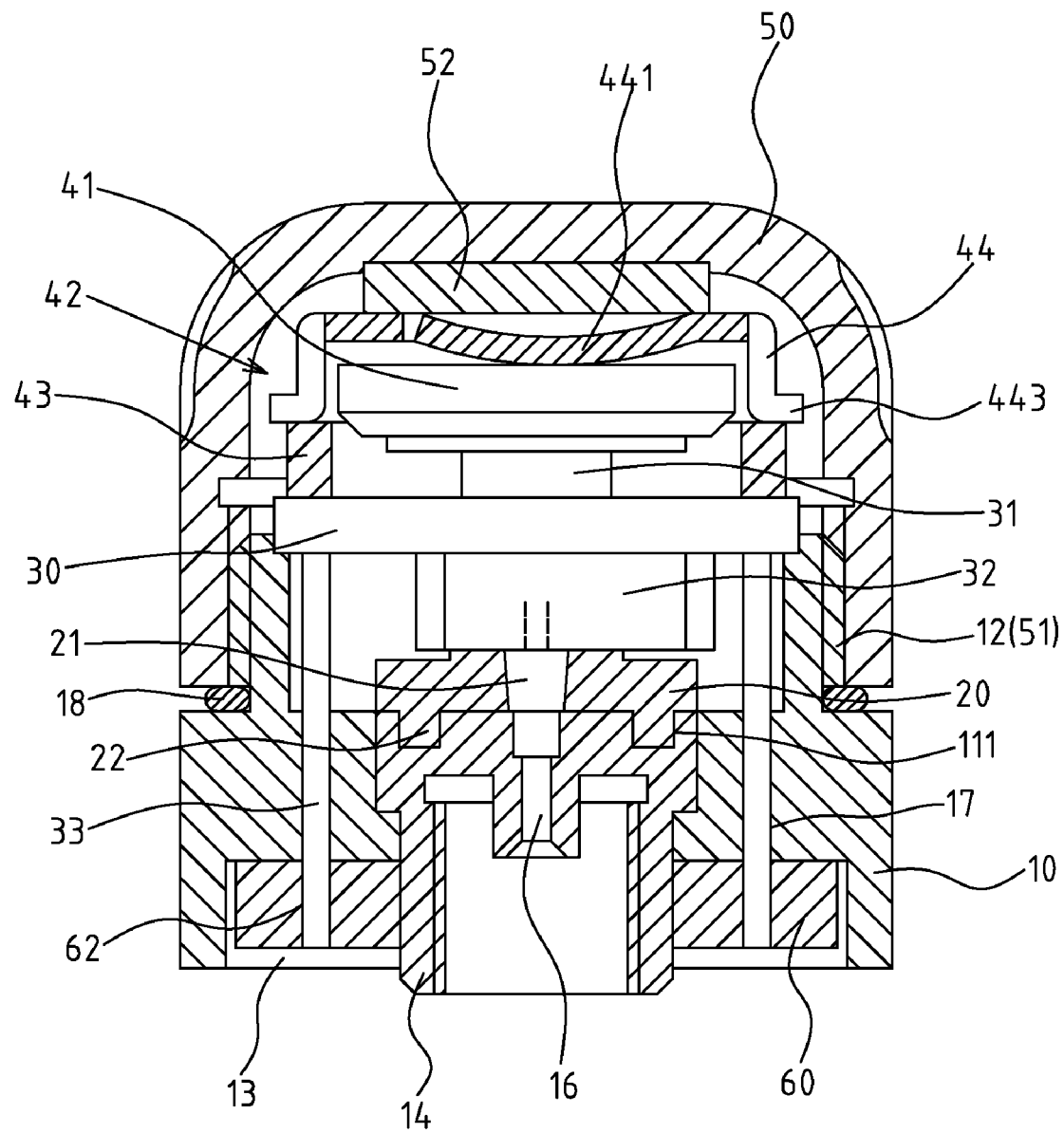
FIG. 4 shows a sectional view of the present invention under a combined state.
Figure 5:
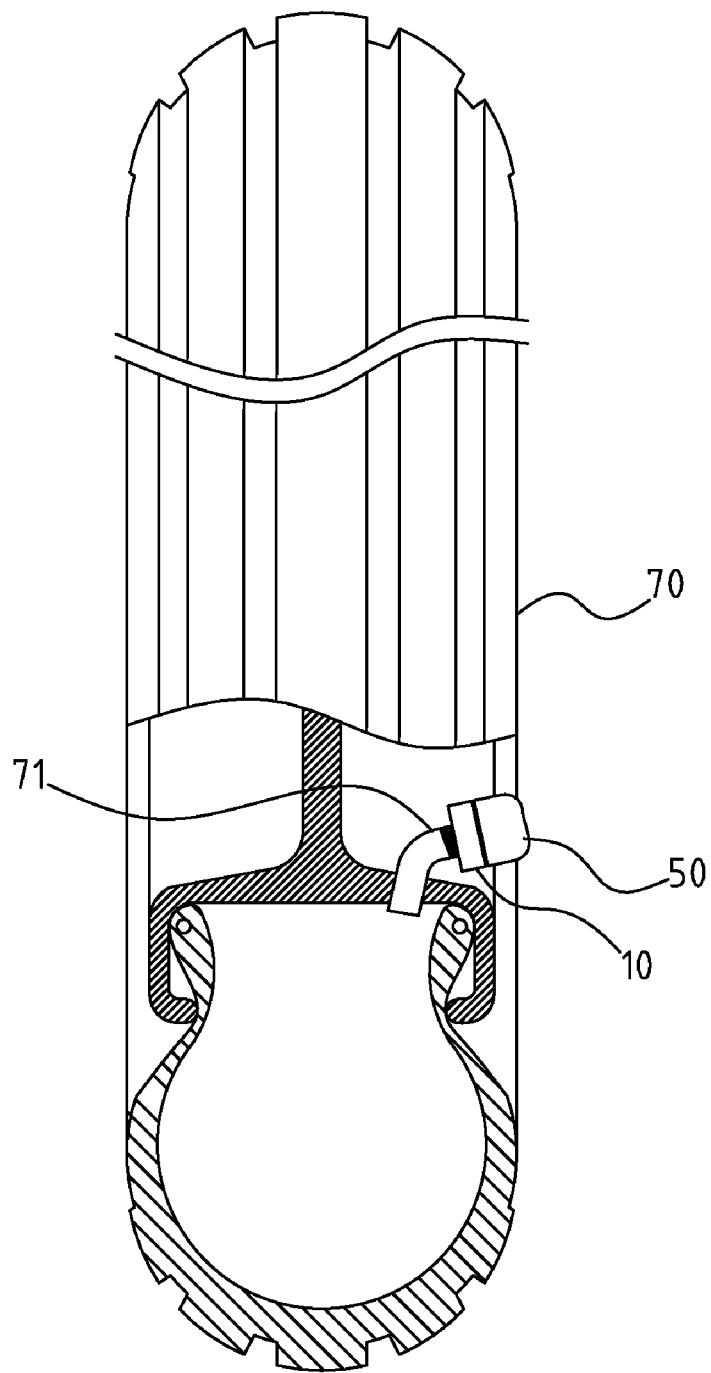
FIG. 5 shows a schematic view of the application of the present invention as assembled onto a tire.

Referring to FIGS. 4 and 5, a removable TPMS with a capped tire valve could be mounted in a manner that the connecting end 14 at the baseplate 10 is sleeved onto the capped tire valve 71. With the rotation of baseplate 10, the assembly portion 15 of the connecting end 14 is screwed securely onto the capped tire valve 71. The air hole 16 is placed opposite to the capped tire valve 71. With the MCU 32 on the circuit board 30, the tire pressure information can be transmitted to the vehicle-mounted receiver via signal conducting wire 33 and antenna 60, thus helping to provide the real-time status of tire pressure. With embedded antenna 60 and removable cap 50, it shall be possible to considerably reduce the volume and provide resistance to collision and pollution, thus ensuring a prolonged service life, ease-of-maintenance and replacement of batteries with improved applicability.

Figure 6:
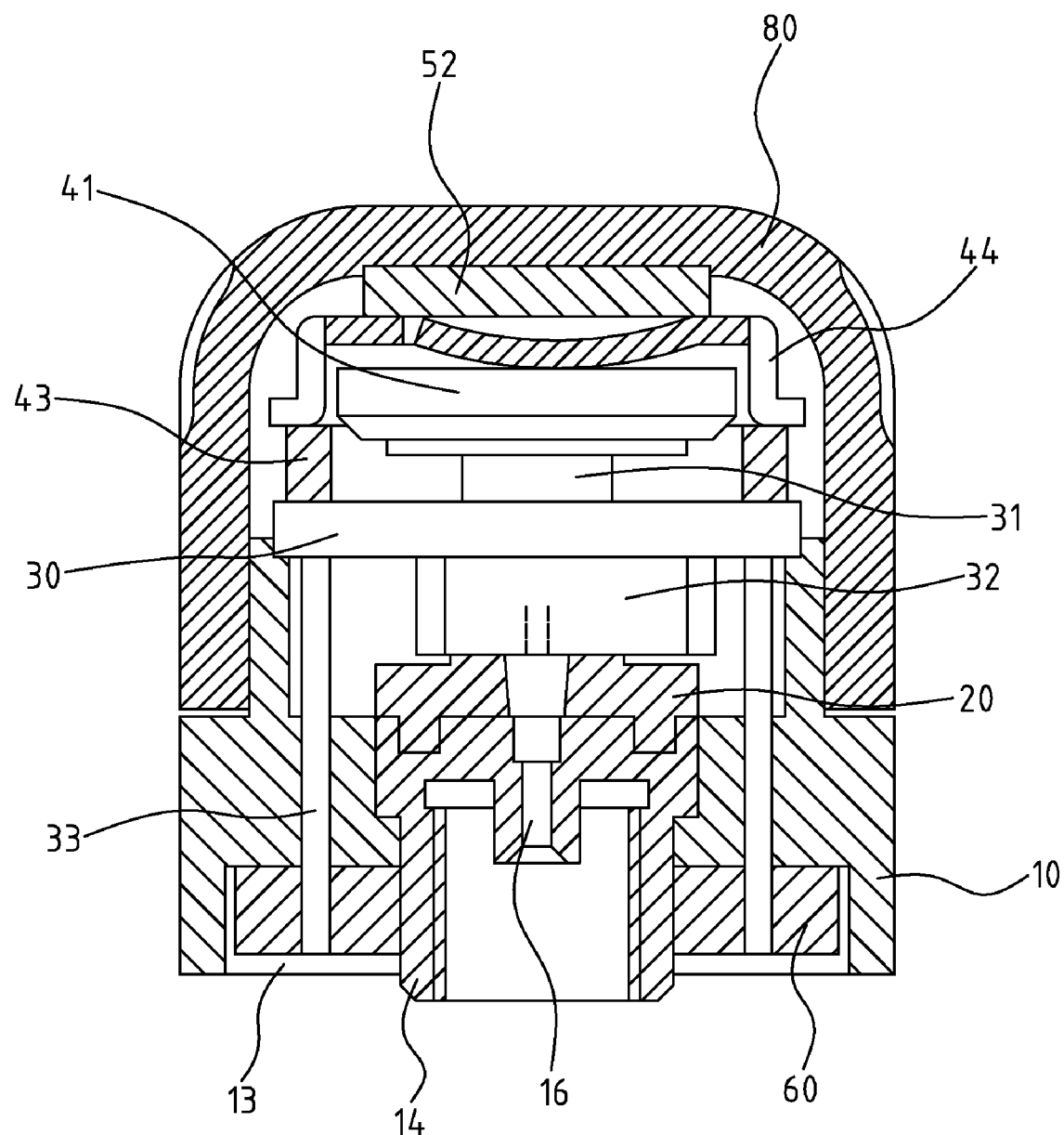
FIG. 6 shows a schematic view of the application of the present invention on another structure.

FIG. 6 depicts another preferred embodiment of the present invention, wherein the cap 80 is fixed onto the baseplate 10.

In sum, the tire pressure monitoring system (TPMS) of the present invention provides an innovative capped TPMS that screws directly onto the capped tire valve 71. The embedded antenna 60 reduces the voltage of the sensor, and provides resistance to collision and pollution with improved applicability.

I claim:

1. A tire pressure monitoring system, which is connected to a capped tire valve of a tire, comprising:
   a baseplate having a connecting end with an air hole at a center of a bottom thereof to connect the capped tire valve and an antenna container surrounding the connecting end, and further having a bored groove on a top thereof;
   a cap detachably connected to the top of the baseplate to form an overhead container therein, so that the overhead container and the antenna container are separated by the baseplate, and the bored groove communicates the overhead container and the antenna container;
   an antenna received in the antenna container of the baseplate;
   a signal transmitter, which is received in the overhead container, having a signal conducting wire connected to the antenna through the bored groove; and
   a power supply received in the overhead container and above the signal transmitter to provide the signal transmitter power, wherein the power supply includes a battery with a bottom end conducted with the signal transmitter and a cover body with a spring conducted with a top end of the battery.

2. The tire pressure monitoring system as defined in claim 1, wherein the antenna container is open at the bottom of the baseplate.

3. The tire pressure monitoring system as defined in claim 1, wherein the cover body further has a plurality of flexible ribs.

4. The tire pressure monitoring system as defined in claim 3, wherein each of the ribs has a flange at a distal end thereof.

5. The tire pressure monitoring system as defined in claim 1, wherein the power supply further includes a ring body to receive the battery therein.

* * * * *